US010657101B2

(12) United States Patent
Liu et al.

(10) Patent No.: US 10,657,101 B2
(45) Date of Patent: *May 19, 2020

(54) TECHNIQUES FOR IMPLEMENTING HYBRID FLASH/HDD-BASED VIRTUAL DISK FILES

(71) Applicant: VMware, Inc., Palo Alto, CA (US)

(72) Inventors: Deng Liu, Palo Alto, CA (US); Sandeep Uttamchandani, Palo Alto, CA (US); Li Zhou, Palo Alto, CA (US); Mayank Rawat, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/990,360

(22) Filed: May 25, 2018

(65) Prior Publication Data
US 2018/0276233 A1 Sep. 27, 2018

Related U.S. Application Data

(63) Continuation of application No. 14/918,569, filed on Oct. 21, 2015, now Pat. No. 9,984,089, which is a (Continued)

(51) Int. Cl.
*G06F 16/00* (2019.01)
*G06F 16/172* (2019.01)
(Continued)

(52) U.S. Cl.
CPC .......... *G06F 16/172* (2019.01); *G06F 3/0604* (2013.01); *G06F 3/0611* (2013.01); *G06F 3/0613* (2013.01); *G06F 3/0643* (2013.01); *G06F 3/0655* (2013.01); *G06F 3/0659* (2013.01); *G06F 3/0679* (2013.01); *G06F 3/0685* (2013.01); *G06F 9/455* (2013.01); *G06F 9/45558* (2013.01); *G06F 16/188* (2019.01);
(Continued)

(58) Field of Classification Search
None
See application file for complete search history.

(56) References Cited

U.S. PATENT DOCUMENTS

2001/0056575 A1* 12/2001 Wei .................. G11B 27/031
725/41
2004/0107314 A1 6/2004 Kim et al.
(Continued)

*Primary Examiner* — David Yi
*Assistant Examiner* — Craig S Goldschmidt

(57) ABSTRACT

Techniques for utilizing flash storage as an extension of hard disk (HDD) storage are provided. In one embodiment, a computer system stores a subset of blocks of a logical file in a first physical file, associated with a first data structure that represents a filesystem object, on flash storage and a subset of blocks, associated with a second data structure that represents a filesystem object comprising tiering configuration information that includes an identifier of the first physical file, in a second physical file on HDD storage. The computer system processes an I/O request directed to the logical file by directing it to either the physical file on the flash storage or the HDD storage by verifying that the tiering configuration information exists in the data structure and determining whether the one or more blocks are part of the first subset of blocks or the second subset of blocks.

20 Claims, 10 Drawing Sheets

Related U.S. Application Data continuation-in-part of application No. 13/931,409, filed on Jun. 28, 2013, now Pat. No. 9,182,927.

(51) Int. Cl.
*G06F 3/06* (2006.01)
*G06F 9/455* (2018.01)
*G06F 16/188* (2019.01)

(52) U.S. Cl.
CPC .............. *G06F 2009/45579* (2013.01); *G06F 2212/217* (2013.01)

(56) References Cited

U.S. PATENT DOCUMENTS

| | | | |
|---|---|---|---|
| 2007/0300037 A1* | 12/2007 | Rogers | G06F 12/0292 711/202 |
| 2009/0089537 A1* | 4/2009 | Vick | G06F 12/0284 711/203 |
| 2010/0281230 A1* | 11/2010 | Rabii | G06F 3/0605 711/165 |
| 2010/0295856 A1 | 11/2010 | Ferreira et al. | |
| 2013/0275680 A1* | 10/2013 | Ikegaya | G06F 3/0608 711/118 |

* cited by examiner

TECHNIQUES FOR IMPLEMENTING HYBRID FLASH/HDD-BASED VIRTUAL DISK FILES

This application is a continuation of U.S. patent application Ser. No. 14/918,569, filed Oct. 21, 2015, which is a continuation-in-part which claims priority from U.S. patent application Ser. No. 13/931,409, filed Jun. 28, 2013, each of which is incorporated by reference in its entirety.

BACKGROUND

Existing techniques for leveraging flash storage devices in a virtualized environment generally involve using such devices as a host-side cache. With this approach, the hypervisor of a host system intercepts virtual machine (VM) I/O requests directed to virtual disks (VMDKs) residing on a shared storage device (e.g., a networked storage array) and stores data retrieved from the shared storage device in a portion of a local flash storage device referred to as a "flash cache." When the hypervisor intercepts a read request for data that is already available in the flash cache, the hypervisor retrieves the requested data directly from the local flash storage device (rather than performing a roundtrip to/from the shared storage device), thereby reducing the I/O latency experienced by the VM.

While host-side flash caching works well for accelerating the I/O performance of individual VMs, this approach does not necessarily make most effective use of flash storage resources, particularly in terms of (1) maximizing overall flash storage utilization and (2) minimizing environment-wide operational costs. With respect to (1), the most significant advantage of flash storage over hard disk (HDD) based storage is low I/O latency and high IOPS; thus, it makes sense to measure flash storage utilization in terms of "I/O absorption rate" (i.e., the percentage of total I/O requests that are serviced from flash storage)—the higher the I/O absorption rate, the better the utilization of flash storage resources. However, when using flash storage as a host-side cache, there is no easy way to maximize I/O absorption rate on a global scale for a given flash storage device or group of devices. There are at least two reasons for this: first, the hypervisor of a host system generally allocates flash cache space in a static manner among VMs or VMDKs at the time of VM/VMDK configuration. As a result, the hypervisor cannot dynamically adjust cache allocations at runtime (in response to, e.g., changing VM workloads or VMDK access patterns) to ensure optimal utilization of flash cache space. Second, the caching algorithms that the hypervisor executes generally make cache admission/eviction decisions for a given VM or VMDK based on the I/O requests for that single VM/VMDK, rather than taking into account the I/O requests for all active VMs/VMDKs.

With respect to (2), host-side flash caching is typically performed with fine-grained cache lines (e.g., 4 KB or 8 KB) in order to maximize caching performance. This means that a relatively large amount of host system memory is needed to maintain cache metadata such as a mapping table, least-recently-used (LRU) list, hash table, and so on. Further, a relatively large number of CPU cycles and I/O operations are needed for cache lookup, eviction, page mapping, write on cache miss, etc. These high memory, CPU, and I/O requirements can significantly increase the costs for operating and maintaining a virtualized environment that utilizes host-side flash caching, which in turn may prevent many organizations from deploying flash storage in such environments on a large scale.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes a framework for effectively leveraging flash storage in a virtualized environment from both a utilization and cost perspective. The framework comprises two parts: (1) a mechanism for using flash storage as an extension of traditional, HDD-based storage in a manner that allows certain types of VMDK files (referred to herein as "hybrid" VMDK files) to be stored partially on a flash storage tier and partially (or wholly) on an HDD storage tier; and (2) a mechanism for dynamically relocating blocks of a hybrid VMDK file between the flash and HDD storage tiers, such that only "performance-critical" blocks are maintained on the flash storage tier. With this framework, the overall utilization of flash storage resources in the virtualized environment can be maximized, while the costs for operating/maintaining the virtualized environment can be reduced or minimized when compared to existing flash caching approaches.

1. System Overview

Figure 1:
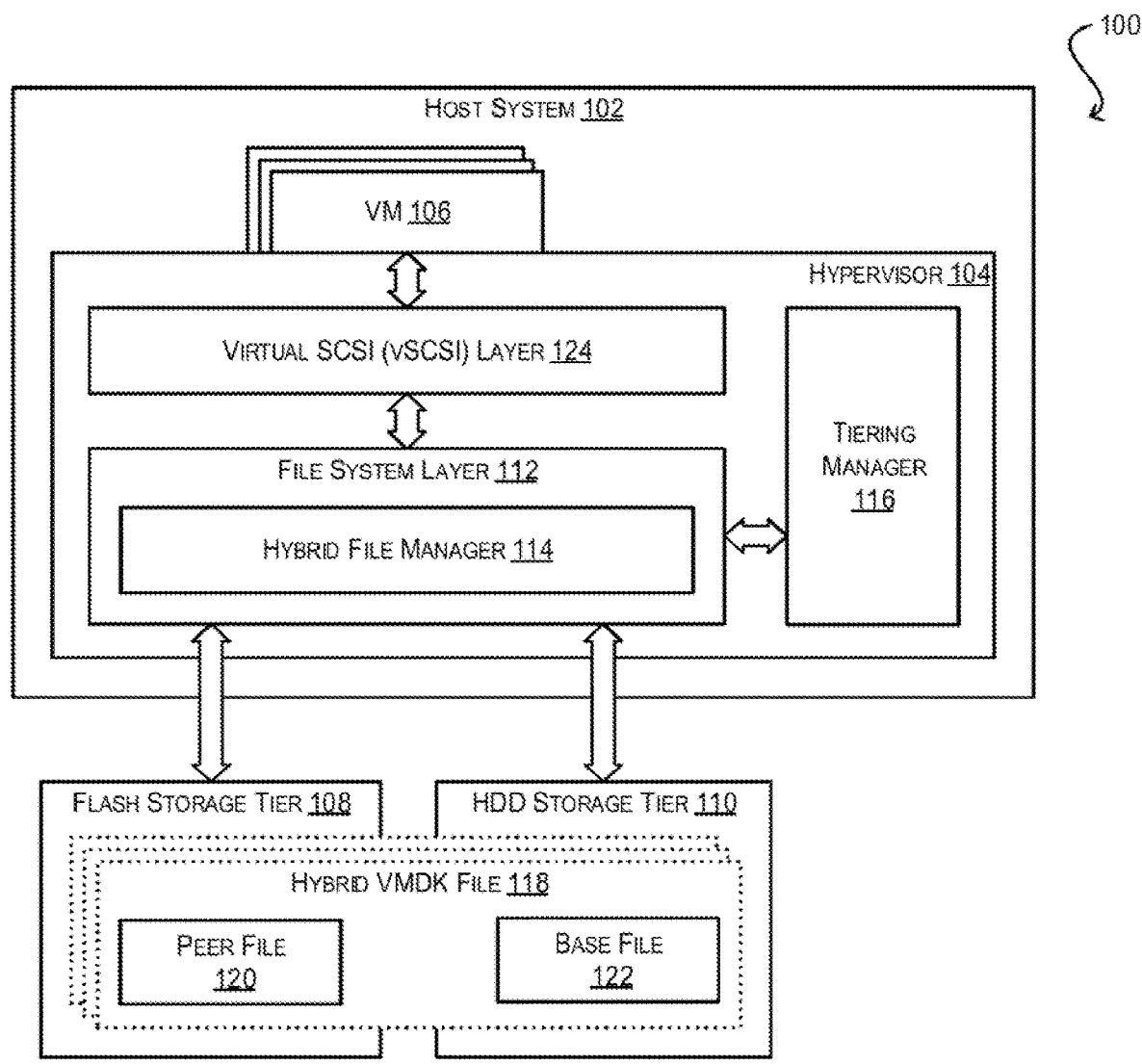
FIG. 1 depicts a block diagram of a virtualized environment that enables effective use of flash storage resources according to an embodiment.

FIG. 1 depicts a virtualized environment 100 that enables effective use of flash storage resources according to an embodiment. As shown, virtualized environment 100 includes a host system 102 that executes a hypervisor 104 (also known as a "virtualization layer" or "virtualization software"). Hypervisor 104 provides an environment in which one or more VMs 106 can run. In one embodiment, hypervisor 104 can interact directly with the hardware platform of host system 102 without an intervening host operating system. In this embodiment, hypervisor 104 can include a kernel (not shown) that manages VM use of the various hardware devices of host system 102. In an alternative embodiment, hypervisor 104 can be part of a "hosted" configuration in which hypervisor 104 runs on top of a host operating system (not shown). In this embodiment, hypervisor 104 can rely on the host operating system for physical resource management of hardware devices. One of ordinary skill in the art will recognize various modifications and alternatives for the design and configuration of hypervisor 104.

In addition to host system 102, virtualized environment 100 includes a flash storage tier 108 and an HDD storage tier 110. Flash storage tier 108 represents a collection of storage devices in virtualized environment 100 that use flash technology for storing data, such as solid-state disks (SSDs), PCI-e based flash cards, dedicated flash appliances or arrays, and the like. HDD storage tier 110 represents a collection of storage devices in virtualized environment 100 that use spinning disk technology for storing data, such as hard disk drives, HDD-based arrays, and the like. The devices of flash storage tier 108 and HDD storage tier 110 can each be formatted using a file system that is understood by a file system layer 112 of hypervisor 104 (e.g., VMware's Virtual Machine File System (VMFS)). Although flash storage tier 108 and HDD storage tier 110 are shown in FIG. 1 as being connected solely to host system 102, it should be appreciated that the devices in tiers 108 and 110 can be connected to (and thus shared among) multiple host systems.

As noted the Background section, existing virtualization platforms typically leverage flash storage resources (such as the devices in flash storage tier 108) as a host-side cache for accelerating the I/O of individual VMs. While host-side flash caching can improve VM I/O performance, this approach may not fully exploit those flash storage resources in terms of overall cost and performance-effectiveness. To address this, hypervisor 104 of host system 102 can implement a novel flash utilization/management framework that includes a hybrid file manager 114 and a tiering manager 116.

At a high level, hybrid file manager 114 can enable file system layer 112 of hypervisor 104 to interact with flash storage tier 108 as a file system block-based extension of HDD storage tier 110. This allows file system layer 112 to create and access logical files (referred to as hybrid files) that are stored partially on flash storage tier 108 and partially (or wholly) on HDD storage tier 110. One type of hybrid file supported by hybrid file manager 114/file system layer 112 is a hybrid virtual disk (VMDK) file (i.e., a hybrid file that holds persistent VM data), such as hybrid VMDK file 118 of FIG. 1.

As shown, hybrid VMDK file 118 comprises a physical "peer" file 120 residing on flash storage tier 108 and a physical "base" file 122 residing on HDD storage tier 110. Peer file 120 can hold one portion of the file system blocks that constitute hybrid VMDK file 118, while base file 122 can hold another portion (or the entirety) of the file system blocks that constitute hybrid VMDK file 118. When file system layer 112 receives (from, e.g., a vSCSI layer 124) a VM I/O request directed to a particular block of hybrid VMDK file 118, hybrid file manager 114 can determine whether the block is physically stored in peer file 120 on flash storage tier 108 and, if so, can redirect the I/O request to peer file 120. Otherwise, hybrid file manager 114 can redirect the I/O request to base file 122 on HDD storage tier 110.

Concurrently with the I/O request processing above, tiering manager 116 can monitor the I/O traffic directed to hybrid VMDK file 118 and periodically identify the blocks of hybrid VMDK file 118 that are "performance-critical"—in other words, blocks that would benefit most from being placed on flash storage tier 108 based on their access history. In one embodiment, tiering manager 116 can perform this identification using a temperature-based prediction model, which is described in detail below. Tiering manager 116 can then move, or relocate, one or more blocks between peer file 120 and base file 122 such that the performance-critical blocks of hybrid VMDK file 118 are placed (or kept) on flash storage tier 108. In this way, tiering manager 116 can increase the likelihood that future VM I/O requests will be serviced from flash storage tier 108 rather than HDD storage tier 110. In a particular embodiment, tiering manager 116 can perform this block relocation process in a lazy/asynchronous manner (i.e., a manner that is not tied to individual VM I/O requests), such as once every 5 minutes, 15 minutes, etc.

The combined capabilities of hybrid file manager 114 and tiering manager 116 can provide a number of benefits that improve the utilization of resources in flash storage tier 108 while keeping the operating costs of virtualized environment 100 low. First, since tiering manager 116 dynamically relocates hybrid VMDK file blocks between tiers 108 and 110 in order to maintain performance-critical blocks in flash storage tier 108, tiering manager 116 can ensure that the I/O absorption rate for flash storage tier 108 is kept high, thereby fully exploiting the performance advantage of flash storage tier 108 over traditional HDD-based storage. This relocation process can also reduce the number of I/Os that reach HDD storage tier 110, which can improve the performance of applications/VMs that need to access non-hybrid files stored on HDD storage tier 110.

Second, unlike flash caching solutions, hybrid file manager 114 and tiering manager 116 do not need to maintain extensive cache metadata (e.g., mapping table, LRU linked list, etc.) or pin such cache metadata in the memory space of host system 102. Instead hybrid file manager 114 and tiering manager 116 can carry out their respective functions using a relatively small amount of metadata that can be swapped in and out of memory as needed. Further, since tiering manager 116 can migrate blocks across tiers 108 and 110 in a lazy/asynchronous fashion (e.g., once every 5 minutes, 15 minutes, etc.), the CPU and I/O bandwidth resources that tiering manager 116 consumes can be significantly less than the resources consumed by a typical flash caching module, which executes caching decisions (e.g., page lookup, cache admission, eviction, etc.) on a per I/O request basis. Taken together, these reduced memory, CPU, and I/O requirements mean that the effective costs for operating virtualized environment 100 (in terms of, e.g., power consumption and capital equipment costs) can be substantially lower than the costs for operating an environment that uses a comparable amount of flash storage for host-side flash caching.

Section 2 below provides further details regarding hybrid VMDK files and the flows that hybrid file manager 114 can perform for creating/managing/accessing such files. Section 3 below provides further details regarding the processing that tiering manager 116 can perform for dynamically relocating blocks of a hybrid VMDK file between flash storage tier 108 and HDD storage tier 110 in order to place and keep performance-critical blocks on flash storage tier 108.

2. Hybrid VMDK Files

As noted with respect to FIG. 1, hybrid VMDK file 118 is a logical entity managed by hybrid file manager 114 that comprises a physical peer file 120 residing on flash storage tier 108 and a physical base file 122 residing on HDD storage tier 110. Peer file 120 can hold a subset of the file system blocks of hybrid VMDK file 118 (while base file 120 can hold a different subset, or the entirety, of the file system blocks of hybrid VMDK file 118), thereby allowing file 118 to be effectively split, at file system block granularity, across flash and HDD storage tiers 108 and 110. In certain embodiments, peer file 120 and base file 122 can share a common logical address space that includes the same file system block offsets. This eliminates the need for a mapping table to determine how the internal blocks of peer file 120 map to base file 122 and vice versa.

Figure 2:
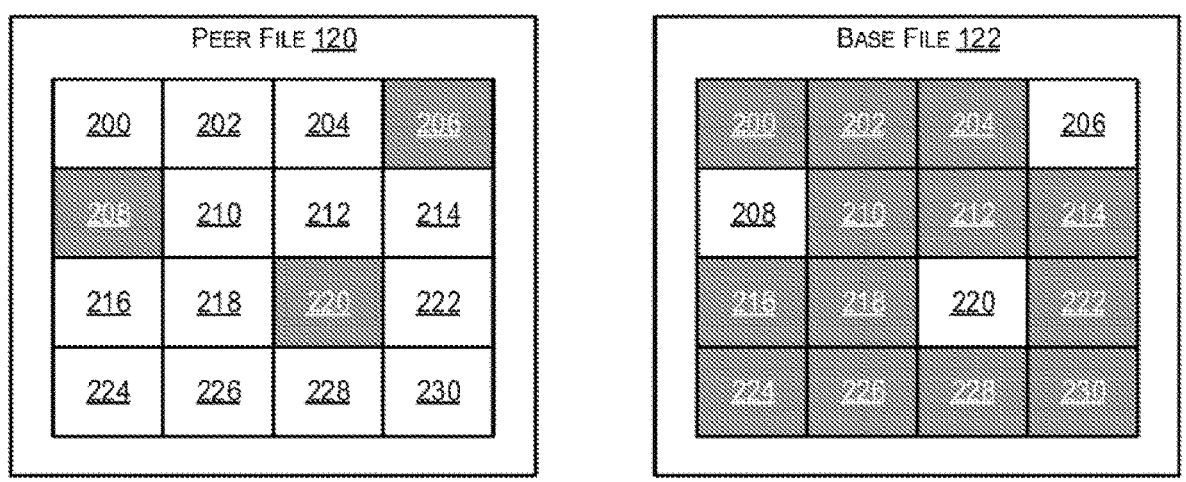
FIG. 2 depicts exemplary peer and base files of a hybrid VMDK file according to an embodiment.

To clarify this file structure, FIG. 2 depicts exemplary block configurations for peer file 120 and base file 122 according to an embodiment. Per FIG. 2, peer file 120 and base file 122 each include a logical address space that comprises common file system block offsets 200-230. In one embodiment, each block offset can correspond to a 1 MB-sized block, although other block sizes may also be supported. Peer file 120 holds data for block offsets 206, 208, and 220, while base file 122 holds data for block offsets 200-204, 210-218, and 222-230 (indicated by shading). Thus, when peer file 120 and base file 122 are "overlapped," they reflect the complete contents of hybrid VMDK file 118.

In FIG. 2, base file 122 does not contain any data for block offsets 206, 208, and 220 (which are stored in peer file 120) and peer file 120 does not contain any data for block offsets 200-204, 210-218, and 222-230 (which are stored in base file 122). Accordingly, in this embodiment, peer file 120 and base file 122 can be considered mutually exclusive (i.e., they do not hold any common data blocks). In alternative embodiments, base file 122 can always hold all of the block data for hybrid VMDK file 118, while peer file 120 can hold copies of a subset of blocks.

Although peer file 120 and base file 122 are allocated the same logical address space, in some embodiments peer file 120 can be implemented as a "sparse file" (i.e., a file that only consumes the amount of physical storage space taken up by its non-empty blocks), and therefore may be smaller in physical size than base file 122. For instance, in the example of FIG. 2, if peer file 120 is implemented as a sparse file, peer file 120 will only need space on flash storage tier 108 for storing blocks 206, 208, and 220 (the remaining empty blocks can be represented via minimal metadata). This advantageously optimizes the usage of space on flash storage tier 108 since flash storage tier 108 will generally have less total capacity than HDD storage tier 110.

2.1 File Metadata

For management and bookkeeping purposes, hybrid file manager 114 can associate each base file and peer file of a hybrid VMDK file with an "inode" data structure. An inode is one example of a data structure that represents a filesystem object, which can be one of various things including a file or a directory. Each inode stores the attributes and disk block location(s) of the filesystem object's data. Filesystem object attributes may include manipulation metadata (e.g. change, access, modify time), as well as owner and permission data (e.g. group-id, user-id, permissions). Another example of a data structure that represents a filesystem object is the New Technology File System (NTFS) master file table (MFT).

Figure 3:
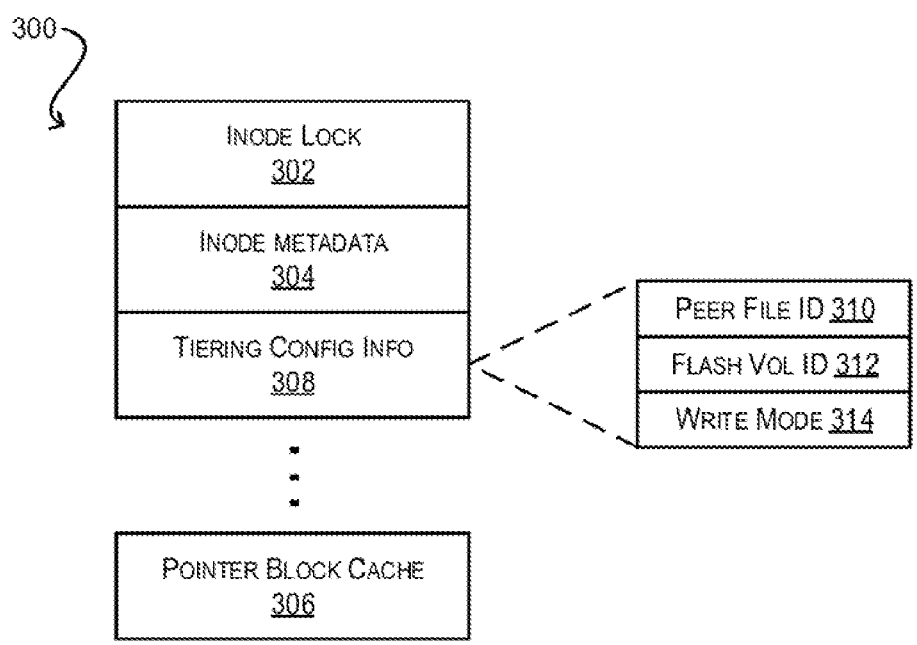
FIG. 3 depicts an exemplary inode data structure for a base file according to an embodiment.

FIG. 3 depicts an example inode 300 for base file 122 of hybrid VMDK file 118 according to an embodiment. As shown, inode 300 includes various fields that are common to traditional file inodes, such as a lock field 302 (for locking write access to the file), a metadata field 304 (for storing file metadata such as owner, creation date, etc.), and a pointer block cache 306 (for maintaining mappings between file system block offsets and logical block addresses (LBAs)).

However, in addition to fields 302-306, inode 300 can also include a novel field 308 referred to as "tiering config info." Tiering config info field 308 can include certain pieces of metadata that are specific to hybrid files such as hybrid VMDK file 118. For example, per FIG. 3, tiering config info field 308 can include a peer file ID 310 that identifies the corresponding peer file (e.g., 120) for the current base file, a flash vol ID 312 that identifies the flash storage volume in flash storage tier 108 on which the peer file is stored, and a write mode parameter 314 that determines how write requests to the hybrid file are handled. As described in Section 2.2 below, hybrid file manager 114 can use the metadata in tiering config info field 308 to facilitate the processing of VM I/O requests directed to hybrid VMDK file 118.

Although not shown, the inode for peer file 120 can be similar in structure to inode 300 for base file 122, but may exclude tiering config info field 308. Further, in certain embodiments, the pointer block cache in the peer file inode can be uniquely adapted to indicate whether a particular file system block is actually stored in peer file 120 or not—for instance, if the file system block is stored in peer file 120, the pointer block cache can resolve to a valid LBA, and if the file system block is not stored in peer file 120 (meaning that the block is in base file 122), the pointer block cache can resolve to a NULL value. Thus, in these embodiments, the pointer block cache can be leveraged as a lookup table to quickly determine whether a given block is available on flash storage tier 108.

In addition to inodes, hybrid file manager 114 can also associate each hybrid VMDK file with a data structure referred to as a "tiering map." The tiering map can include a bit value (i.e., 0 or 1) for each file system block of the hybrid VMDK file that identifies the current placement of the block on flash storage tier 108 or HDD storage tier 110. As described in Section 3 below, tiering manager 116 can use the tiering map to facilitate the process of relocating blocks between tiers 108 and 110.

2.2 I/O Request Processing Flow

Figure 4:
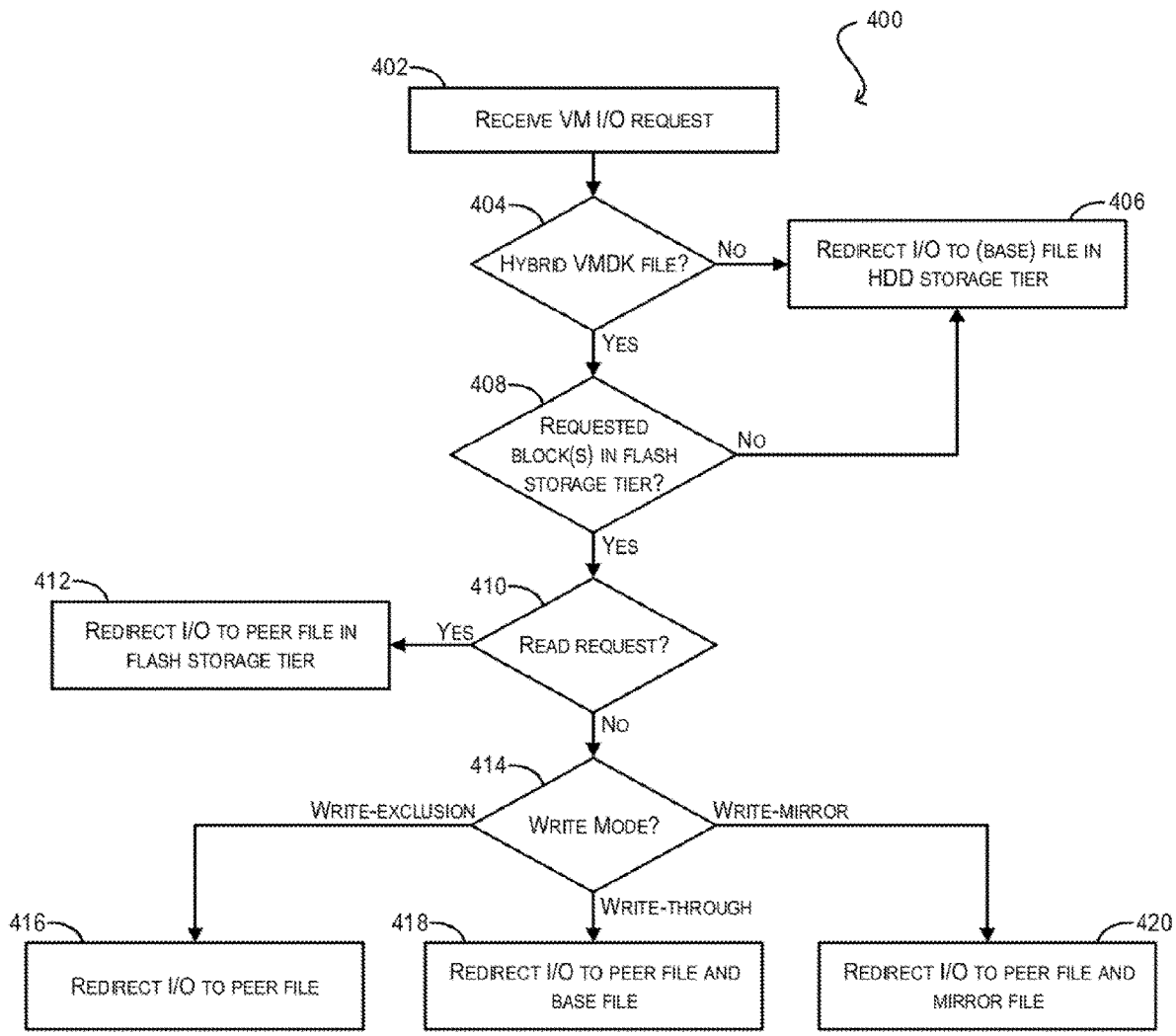
FIG. 4 depicts a flowchart for processing an I/O request directed to a hybrid VMDK file according to an embodiment.

FIG. 4 depicts a flowchart 400 that hybrid file manager 114 can perform at runtime of host system 102 for processing VM I/O requests according to an embodiment. In particular, flowchart 400 illustrates how hybrid file manager 114 can identify a request as being directed to a hybrid VMDK file (such as hybrid VMDK file 118 of FIG. 1) and automatically redirect the request to flash storage tier 108 or HDD storage tier 110 as appropriate.

At steps 402 and 404, hybrid file manager 114 can receive an I/O request originating from a VM (e.g., VM 106) and determine whether the request is directed to a hybrid VMDK file or a non-hybrid VMDK file. In a particular embodiment, hybrid file manager 114 can perform this determination by checking whether the inode for the file on HDD storage tier 110 (i.e., the base file) includes tiering config info field 308 described with respect to FIG. 3. For example, the existence of tiering config info field 308 can indicate that the file is a hybrid VMDK file, while the absence of tiering config field 308 can indicate that the file is not a hybrid VMDK file. If hybrid file manager 114 determines that the file is not a hybrid VMDK file, hybrid file manager 114 can redirect the I/O to HDD storage tier 110 and the flowchart can end (step 406).

On the other hand, if hybrid file manager 114 determines that the file is a hybrid VMDK file (e.g., 118), hybrid file manager 114 can determine whether the requested file system block(s) in the I/O request are stored in the hybrid VMDK file's peer file (e.g., 120) on flash storage tier 108 (step 408). In one embodiment, hybrid file manager 114 can perform the determination at step 408 by referring to the pointer block cache in peer file 120's inode data structure. As noted previously, this pointer block cache can act as a lookup table that indicates the placement of a particular block on flash storage tier 108 or HDD storage tier 110 (depending on whether the block offset resolves to a valid LBA or a NULL value). In an alternative embodiment, hybrid file manager 114 can perform the determination at step 408 by referring to the tiering map for hybrid VMDK file 118.

If the requested block(s) are not stored in peer file 120 on flash storage tier 108, hybrid file manager 114 can conclude that the block(s) reside on HDD storage tier 110 and thus can redirect the I/O to corresponding base file 122 (step 406).

Otherwise, hybrid file manager 114 can move on to checking whether the I/O request is a read request or a write request (step 410). In the former case, hybrid file manager 114 can redirect the I/O to peer file 120 and flowchart 400 can end (step 412). In the latter case, hybrid file manager 114 can retrieve and evaluate write mode parameter 314 in tiering config info field 308 of base file 122's inode (step 414).

As discussed with respect to FIG. 3, write mode parameter 314 can control how hybrid file manager 114 processes write requests for hybrid files. In the example of FIG. 4, there are three possible write mode values: "write-exclusion," "write-though," and "write-mirror." If write mode parameter 314 is set to write-exclusion, hybrid file manager 114 can redirect the I/O solely to peer file 120 (such that only flash storage tier 108 is updated with the write data) (step 416). This write mode may be useful in cases where fast write performance is desired, and where HDD storage tier 110 may be shared among multiple host systems.

If write mode parameter 314 is set to write-through, hybrid file manager 114 can redirect the I/O to both peer file 120 and base file 122 (thereby propagating the write to both tiers 108 and 110) (step 418). Generally speaking, this write mode will result is slower write performance than write-exclusion, but may be useful for data that needs to be maintained in a durable and consistent state on HDD storage tier 110 at all times.

Finally, if write mode parameter 314 is set to write-mirror, hybrid file manager 114 can direct the write to peer file 120 on flash storage tier 108 as well as a third, mirror file (located on flash storage tier 108, HDD storage tier 110, or any other storage location) (step 420). This write mode may be useful for creating and maintaining a redundant backup of peer file 120.

2.3 Tiering Operations

In addition to performing the I/O request processing flow of FIG. 4, hybrid file manager 114 can also execute a number of functions (referred to as "tiering operations") for managing the lifecycle of hybrid files and enabling the movement of blocks between a hybrid file's respective peer and base files. These tiering operations can include, e.g., a "tiering setup" operation for creating a hybrid file from a non-hybrid file, a "tier-up" operation for moving one or more blocks of a hybrid file from the its base file on HDD storage tier 110 to its peer file on flash storage tier 108, a "tier-down" operation for moving one or more blocks of a hybrid file from its peer file on flash storage tier 108 to its base file on HDD storage tier 110, and a "collapse tier" operation for converting a hybrid file into a non-hybrid file. In certain embodiments, tiering manager 116 can invoke one or more of these operations as part of its process of dynamically relocating hybrid VMDK file blocks between flash and HDD storage tiers 108 and 110.

Figure 5:
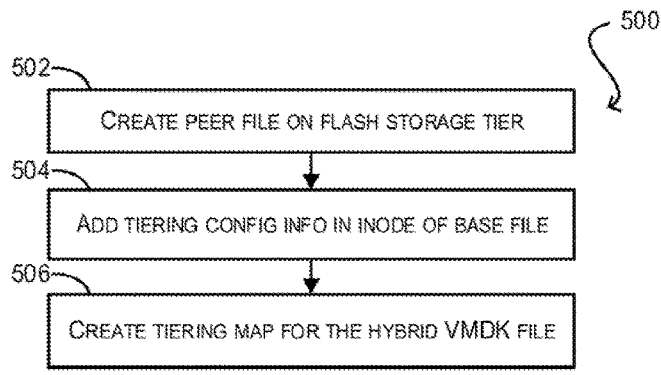
FIG. 5 depicts a flowchart for processing a tiering setup operation according to an embodiment.

FIG. 5 depicts a flowchart 500 that can be performed by hybrid file manager 114 for carrying out the tiering setup operation according to an embodiment. Flowchart 500 assumes that hybrid file manager 114 has received, as input to the tiering setup operation, an identification of a non-hybrid file on HDD storage tier 110 that should be converted into a hybrid file.

At step 502, hybrid file manager 114 can create a peer file for the non-hybrid file on flash storage tier 108. In one embodiment, this can include copying one or more file system blocks from the non-hybrid file to the peer file. Alternatively, the peer file can be created as an empty file.

At step 504, hybrid file manager 114 can add tiering config info field 308 (with relevant metadata such as peer file ID, flash volume ID, write mode, etc.) to the inode of the non-hybrid file on HDD storage tier 110. This step essentially turns the non-hybrid file into the base file for the new hybrid file.

Finally, at step 506, hybrid file manager 114 can create a tiering map for the new hybrid file that indicates the placement of blocks in the corresponding peer and base files. If the peer file was created as an empty file at block 502, the tiering map can indicate that all of the blocks are initially resident in the base file.

Figure 6:
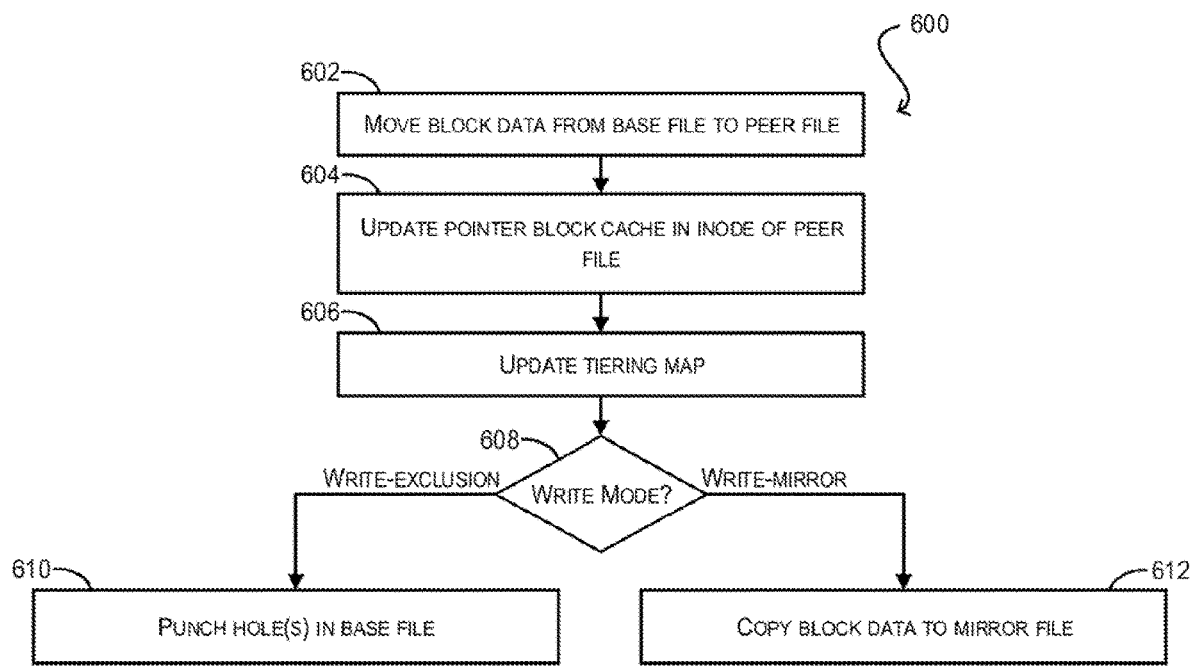
FIG. 6 depicts a flowchart for processing a tier-up operation according to an embodiment.

FIG. 6 depicts a flowchart 600 that can be performed by hybrid file manager 114 for carrying out the tier-up operation according to an embodiment. Flowchart 600 assumes that hybrid file manager 114 has received, as input to the tier-up operation, an identification of a hybrid file and the offsets of one or more blocks in the hybrid file that should be moved.

At step 602, hybrid file manager 114 can move the block data stored at the received offsets from the hybrid file's base file on HDD storage tier 110 to the hybrid file's peer file on flash storage tier 108. Further, at steps 604 and 606, hybrid file manager 114 can update the pointer block cache in the peer file's inode to include appropriate mappings for the newly added blocks, as well as update the hybrid file's tiering map to reflect the new block locations.

At step 608, hybrid file manager 114 can check the write mode parameter in tiering config info field 308 of the base file's inode. If the write mode is set to write-exclusion, hybrid file manager 114 can "punch a hole" in the base file for each of the migrated blocks, indicating that the latest versions of those blocks are stored on flash storage tier 108 (step 610). On the other hand, if the write mode is set to write-mirror, hybrid file manager 114 can copy the migrated block data to a preconfigured mirror file (step 612).

Figure 7:
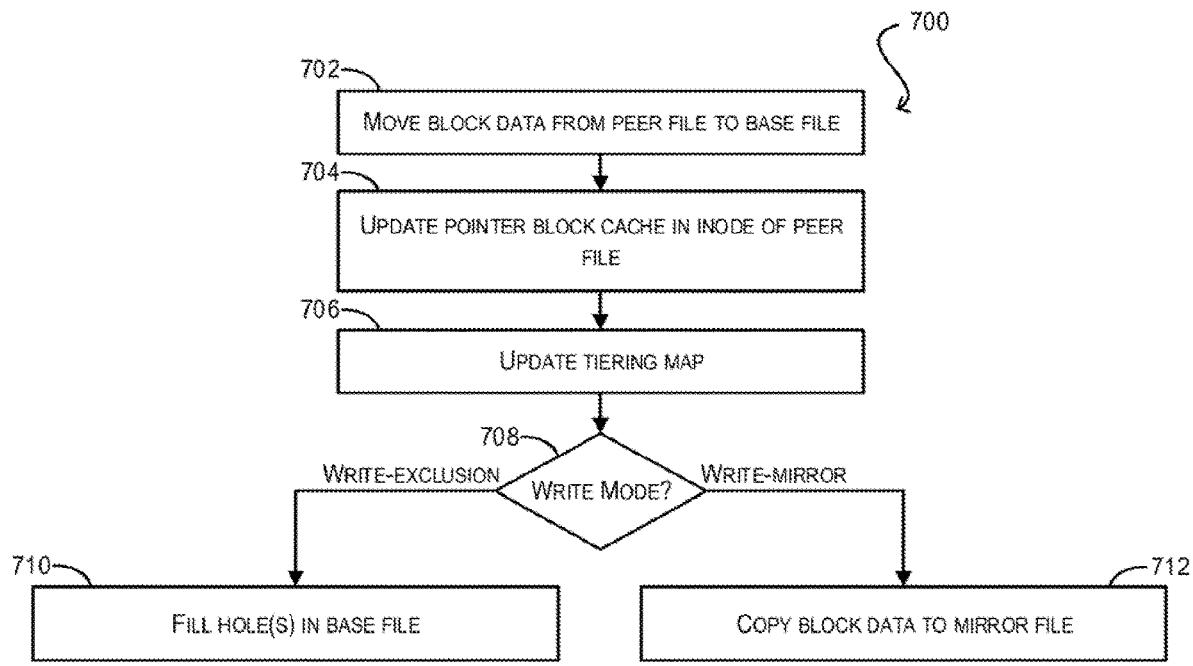
FIG. 7 depicts a flowchart for processing a tier-down operation according to an embodiment.

FIG. 7 depicts a flowchart 700 that can be performed by hybrid file manager 114 for carrying out the tier-down operation according to an embodiment. Flowchart 700 assumes that hybrid file manager 114 has received, as input to the tier-down operation, an identification of a hybrid file and the offsets of one or more blocks in the hybrid file that should be moved.

At step 702, hybrid file manager 114 can move the block data stored at the received offsets from the hybrid file's peer file on flash storage tier 108 to the hybrid file's base file on HDD storage tier 110. Further, at steps 704 and 706, hybrid file manager 114 can update the pointer block cache in the peer file's inode to delete mappings for the migrated blocks, as well as update the hybrid file's tiering map to reflect the new block locations.

At step 708, hybrid file manager 114 can check the write mode parameter in tiering config info field 308 of the base file's inode. If the write mode is set to write-exclusion, hybrid file manager 114 can fill in any holes in the base file corresponding to the migrated data (step 710). On the other hand, if the write node is set to write-mirror, hybrid file manager 114 can copy the migrated block data to a preconfigured mirror file (step 712).

Figure 8:
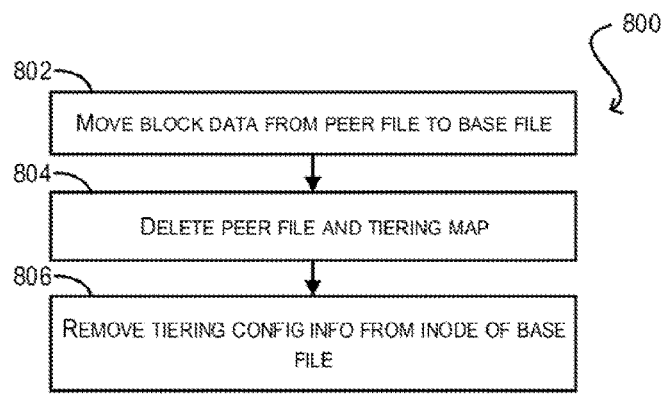
FIG. 8 depicts a flowchart for processing a collapse tier operation according to an embodiment.

FIG. 8 depicts a flowchart 800 that can be performed by hybrid file manager 114 for carrying out the collapse tier operation according to an embodiment. Flowchart 800 assumes that hybrid file manager 114 has received, as input to the collapse tier operation, an identification of a hybrid file that should be converted into a non-hybrid file.

At step 802, hybrid file manager 114 can move all of the block data in the hybrid file's peer file on flash storage tier 108 to the hybrid file's base file on HDD storage tier 110. In addition, at step 804, hybrid file manager 114 can delete the peer file and the tiering map associated with the hybrid file.

At step 806, hybrid file manager 114 can remove tiering config info field 308 from the base file's inode, thereby converting the base file into a conventional, non-hybrid file.

3. Dynamic Block Relocation Between Flash and HDD Storage Tiers

The remaining sections of this disclosure describe the operation of tiering manager 116 of FIG. 1. As noted previously, tiering manager 116 can carry out a process for dynamically relocating hybrid VMDK file blocks between flash storage tier 108 and HDD storage tier 110 during the runtime of host system 102. This process can ensure that performance-critical blocks are always maintained on flash storage tier 108, thereby maximizing the utilization of those flash storage resources.

In certain embodiments, tiering manager 116 can perform the block relocation described above at a recurring time interval (referred to as an "epoch") that is relatively infrequent (e.g., 5 minutes, 15 minutes, or more) and that is independent of the rate at which VM I/O requests are received by hypervisor 104. By performing its processing in such a lazy and asynchronous manner, tiering manager 116 can avoid placing a large resource burden on host system 102.

For example, in one embodiment, tiering manager 116 can keep all of its relevant metadata (e.g., a heat map, per-file tiering maps) on HDD storage tier 110 and simply load/unload the metadata into/out of a temporary memory buffer once per epoch. As a result, tiering manager 116 can consume significantly less memory than existing flash caching solutions, which generally require a large amount of cache metadata to be constantly pinned in memory.

Further, since tiering manager 116 does not perform any calculations or internal I/O until the conclusion of each epoch, its CPU and I/O overhead can be fairly low. In contrast, flash caching solutions typically carry out a synchronous evaluation/update of the flash cache for every VM I/O request, which can consume a considerable amount of CPU cycles and I/O bandwidth (particularly as the number of concurrently running VMs increases).

3.1 High Level Flow

Figure 9:
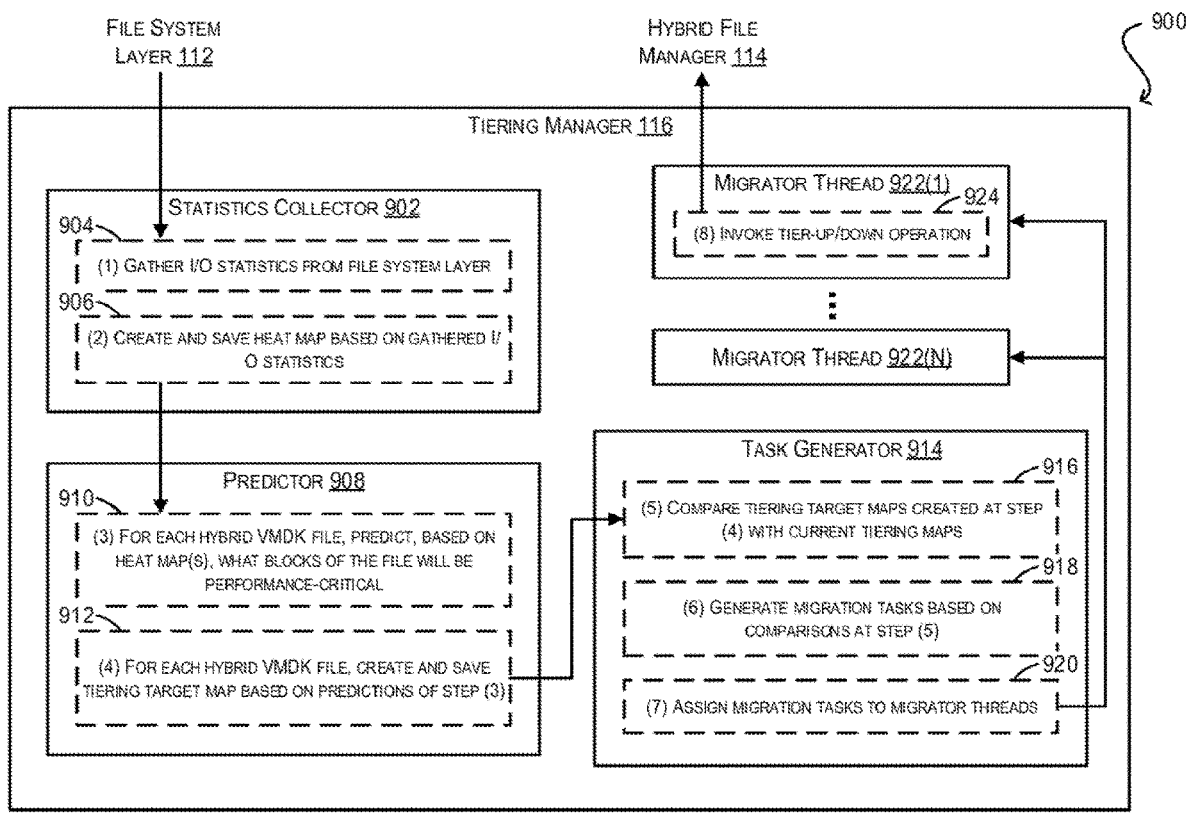
FIG. 9 depicts a flow for dynamically relocating blocks of a hybrid VMDK file between a flash storage tier and an HDD storage tier according to an embodiment.

FIG. 9 depicts a flow 900 that explains, at a high level, how tiering manager 116 can dynamically relocate hybrid VMDK file blocks between flash and HDD storage tiers 108 and 110 according to an embodiment. In a particular embodiment, tiering manager 116 can perform flow 900 once per epoch.

At step (1) (reference numeral 904), a statistics collector 902 of tiering manager 116 can gather, from file system layer 112, I/O statistics pertaining to all of the hybrid VMDK files maintained on tiers 108 and 110 for a current epoch. The I/O statistics can include, e.g., "popularity" information" that indicates the number of times each file system block of each hybrid VMDK file has been accessed during the epoch.

Once the current epoch has ended, statistics collector 902 can generate a "heat map" that encapsulates the popularity information gathered at step (1) (step (2), reference numeral 906). The heat map can include one entry per file system block, where each entry comprises a first field identifying the hybrid VMDK file, a second field identifying the file system block offset, and a third field identifying the number of I/O accesses. In one embodiment, the first field can occupy 8 bytes, the second field can occupy 4 bytes, and the third field can occupy 4 bytes, for a total of 16 bytes per entry. In alternative embodiments, other data lengths or formats may be used.

As part of step (2), statistics collector 902 can flush the generated heat map to disk (e.g., to HDD storage tier 110), thereby avoiding the need to keep it pinned in the working memory of host system 102.

At step (3) (reference numeral 910), a predictor module 908 of tiering manager 116 can predict, based the heat map generated at step (2) (as well as zero or more historical heat maps generated during prior epochs), which blocks of each hybrid VMDK file are/will be performance-critical (i.e., benefit the most from being placed on flash storage tier 108). In certain embodiments, predictor module 908 can perform this prediction using a temperature-based model that quantifies the "hotness" or "coolness" of each block based on past variations in I/O access popularity. For example, if a block is hot, it is more likely that it will be accessed in the future (and thus, hotter blocks are better suited for placement on flash storage tier 108). Conversely, if a block is cold, it is less likely that the block will be accessed in the future (and thus, colder blocks are better suited for placement on HDD storage tier 110). The details of this temperature-based model are described in Section 3.2 below.

Once the blocks of each hybrid VMDK file have been classified as being performance-critical or non-performance-critical, predictor module 908 can create and save a "tiering target map" for the file (step (4), reference numeral 912). The tiering target map can indicate that the performance-critical blocks identified at step (3) should be placed on flash storage tier 108 for the next epoch, while the non-performance-critical blocks should be placed on HDD storage tier 110 for the next epoch.

At step (5) (reference numeral 916), a task generator 914 of tiering manager 116 can compare the tiering target maps generated at step (4) with the current tiering map of each hybrid VMDK file. Task generator 914 can then generate, based on the comparisons, a set of migration tasks for moving certain blocks between flash storage tier 108 and HDD storage tier 110 in order to arrive at a storage configuration that matches the tiering target maps (step (6), reference numeral 918). For instance, one migration task may involve moving one or more blocks for a hybrid VMDK file "A" from flash storage tier 108 to HDD storage tier 110. Another migration task may involve moving one or more blocks for a hybrid VMDK file "B" from HDD storage tier 110 to flash storage tier 108.

In one embodiment, task generator 914 can perform steps (5) and (6) on a per-file basis, which is described in Section 3.3 below. In other embodiments, task generator 914 can perform steps (5) and (6) in a global manner that takes into the account the current placement of all blocks (across VMDK file boundaries) when determining which blocks to migrate.

At step (7) (reference numeral 920), task generator 914 can assign each migration task to a migrator thread in a pool of migrator threads 922(1)-922(N). Each migrator thread can execute its assigned migration task by invoking the appropriate "tier-up" or "tier-down" operation exposed by hybrid file manager 114 (step (8), reference numeral 924). In a particular embodiment, all migration tasks can be performed in the context of file system transactions to ensure the consistency of the file system structures on flash and HDD storage tiers 108 and 110 in the event of a host system crash.

Finally, although not shown, flow 900 can return to step (1) and tiering manager 116 can repeat flow 900 for the next epoch. This process can continue indefinitely while hypervisor 104 remains running on host system 102.

3.2 Temperature-Based Prediction Model

As noted with respect to step (3) of flow 900, predictor module 908 of tiering manager 116 can use a temperature-based model for predicting which file system blocks for a given hybrid VMDK file are/will be performance-critical (and thus should be placed on flash storage tier 108 for the next epoch). In certain embodiments, this temperature-based model can take into account at least four dimensions: frequency, recency, fairness, and randomness. Frequency represents the popularity of a block (i.e., how frequently it has been accessed). Recency represents how recently in time a particular block has been popular. For instance, a block that was accessed 1000 times an hour ago should be considered less performance-critical than a block that was accessed the same number of times just one minute ago. Fairness is a human-defined factor that determines how important one workload is relative to another workload. And randomness defines the percentage of random access I/O requests among all of the I/O requests monitored by tiering manager 116.

To capture the four dimensions described above, the temperature-based model can define an I/O "temperature" for each file system block that takes into account variations in the block's I/O access popularity over time. For example, for each epoch in a predetermined number of epochs (e.g., from the most recent epoch to N past epochs), the temperature for the block can be increased via a "heating effect" that is based on the number of I/O accesses during the epoch (i.e., the frequency dimension) and a constant value that is designated for the hybrid VMDK file by a user/administrator (i.e., the fairness dimension). Further, the temperature can be decreased by a "cooling effect" that is based on how far in the past the epoch occurred (i.e., the recency dimension). Predictor module 908 can then use the final temperature to predict whether the file system block is performance-critical or not (where a higher temperature indicates greater likelihood of being performance-critical, and a lower temperature indicates lower likelihood of being performance-critical).

Figure 10:
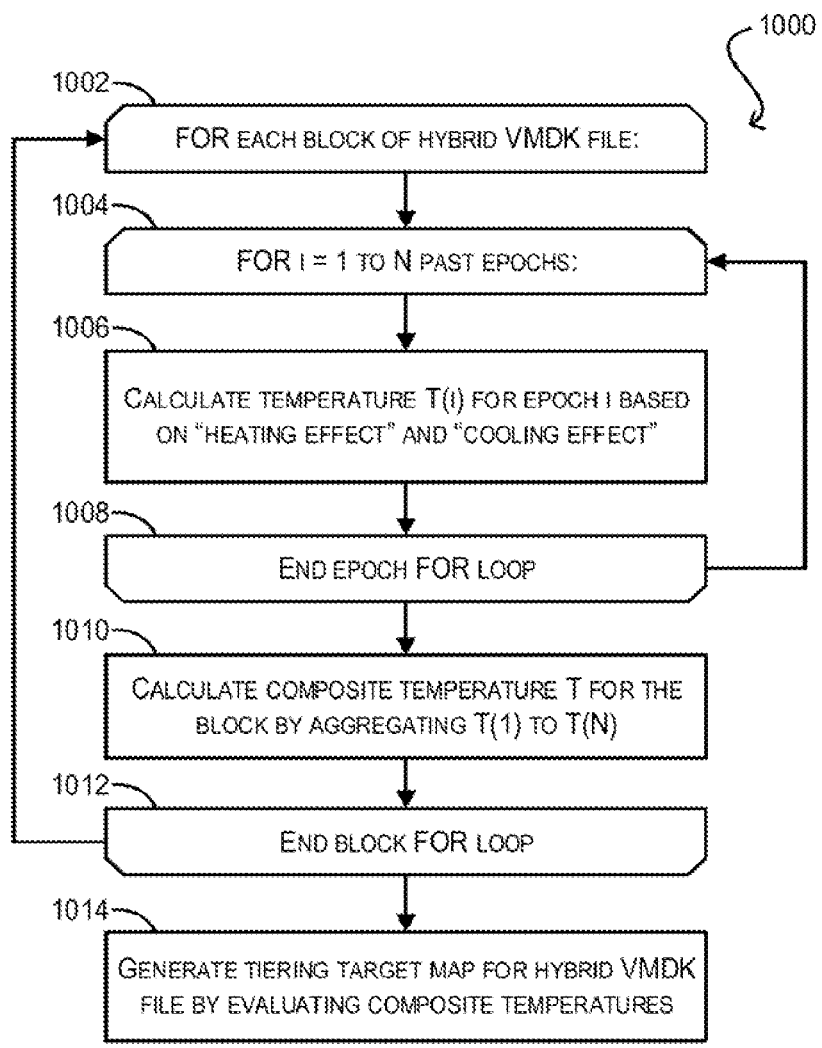
FIG. 10 depicts a flowchart for identifying performance-critical blocks of a hybrid VMDK file according to an embodiment.

FIG. 10 depicts a flowchart 1000 that provides additional details regarding this temperature-based prediction process. At step 1002, predictor module 908 can enter a first loop for each file system block of a particular hybrid VMDK file. Further, at step 1004, predictor module 908 can enter a second loop for each epoch i from 1 to N (where 1 represents the most recent epoch and N represents the Nth past epoch). In a particular embodiment, variable N can be set to 8, although other values are possible.

At step 1006, predictor module 908 can calculate a block temperature T(i) for epoch i based on the heating effect and cooling effect noted above. The heating effect (i.e., H(M)) can take into account the number of I/O accesses for the file system block during epoch i (i.e., M) and a user-defined weight factor for the hybrid VMDK file (i.e., λ). In one embodiment, heating effect H(M) can be represented as follows:

$$H(M) = \lambda \times M$$

The cooling effect (i.e., C(M, i)) can take into account the number of I/O accesses for the file system block during epoch i (i.e., M) and the position of epoch i in the range 1 to N. Generally speaking, the cooling effect can represent a decline in the heating effect over time. Thus, in one embodiment, cooling effect C(M, i) can modify heating effect H(M) such that, if epoch i is in the first half of epochs from 1 to N, temperature T(i) is reduced linearly from 100% to 50%. On the other hand, if epoch i is in the second half of epochs from 1 to N, temperature T(i) is reduced by an exponential factor. A particular implementation of this algorithm results in the following equation for calculating T(i):

$$T(i) = \begin{cases} \lambda \times M \times \dfrac{N+1-i}{N} & \text{where } i < \dfrac{N}{2} + 1 \\ \dfrac{\lambda \times M}{2^{i-3}} & \text{where } \dfrac{N}{2} + 1 \leq i \leq N \end{cases}$$

Once predictor module 908 has calculated T(i) as noted above for every epoch i from 1 to N, the second loop can end (step 1008) and predictor module 908 can generate a composite temperature T for the file system block by aggregating the values of T(1) to T(N) (step 1010). Predictor module 908 can then repeat steps 1004-1010 for the remaining file system blocks of the hybrid VMDK file until it has calculated composite temperatures for every block (step 1012).

Finally, at step 1014, predictor module 908 can evaluate the composite temperatures calculated at block 1010 and identify the performance-critical blocks of the hybrid VMDK file. For example, in a particular embodiment, predictor module 908 can apply a preconfigured threshold to the composite temperatures and classify (1) all blocks with a composite temperature above the threshold as being performance-critical, and (2) all blocks with a composite temperature below the threshold as being non-performance-critical. Predictor module 908 can thereafter generate a tiering target map for the hybrid VMDK file that assigns the performance-critical blocks to flash storage tier 108 (with the remaining blocks being assigned to HDD storage tier 110).

3.3 Task Generator Flow

Figure 11:
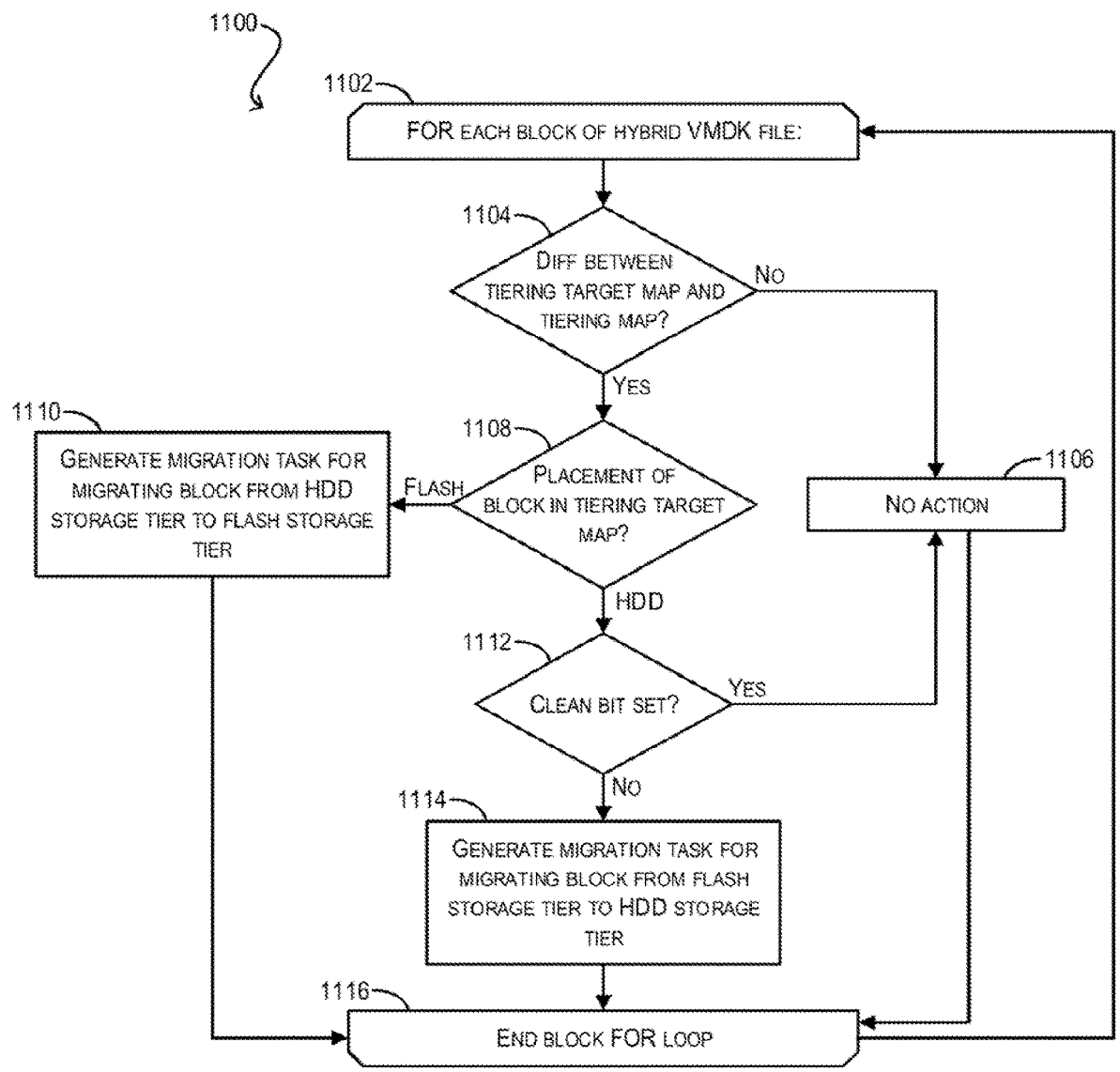
FIG. 11 depicts a flowchart for generating migration tasks according to an embodiment.

FIG. 11 is a flowchart 1100 that provides additional details regarding the processing that task generator 914 of tiering manager 116 can perform for comparing tiering target maps to tiering maps and generating migration tasks (per, e.g., steps (5) and (6) of flow 900) according to an embodiment. Flowchart 1100 assumes that task generator 914 performs this map comparison/task generation process on a per-file basis. However, as noted with respect to flow 900, in alternative embodiments other approaches (such as a global comparison approach) can be used.

At step 1102, task generator 914 can enter a loop for each file system block of a particular hybrid VMDK file. Within the loop, task generator 914 can first check whether there is any difference in the placement of the block between the tiering target map (generated at, e.g., step 1014 of flowchart 1000) and the current tiering map of the hybrid VMDK file (step 1104).

If there is no discrepancy between the tiering target map and the tiering map, task generator 914 can conclude that the block does not need to be moved and flowchart 1100 can end (step 1106).

Otherwise, task generator 914 can check the placement of the block in the tiering target map (step 1108). If the tiering target map indicates that the block should be placed on flash storage tier 108, task generator 914 can generate a migration task for moving the block from HDD storage tier 110 to flash storage tier 108 and the current loop iteration can end (block 1116).

If the tiering target map indicates that the block should be placed on HDD storage tier 110, task generator 914 can move on to checking whether a "clean bit" for the block has been set (step 1112). In certain embodiments, this clean bit can be a per-block bit value in the hybrid VMDK file's tiering map (or some other metadata data structure) that indicates whether the block contains dirty (i.e., unflushed) write data. Thus, in these embodiments, task generator 914 can use the clean bit to determine whether the block data in the hybrid VMDK file's peer file on flash storage tier 108 needs to be written out to the base file on HDD storage tier 110.

If task generator 914 determines that the clean bit is set at step 1112, task generator 914 can determine that the base file already contains the latest data for the block and flowchart 1100 can end (step 1106).

On the other hand, if task generator 914 determines that the clean bit is not set, task generator 914 can generate a migration task for moving the block from flash storage tier 108 to HDD storage tier 110 and the current loop iteration can end (block 1116). Flowchart 1100 can then return to block 1104 until all of the blocks in the hybrid VMDK file have been processed.

Figure 12:
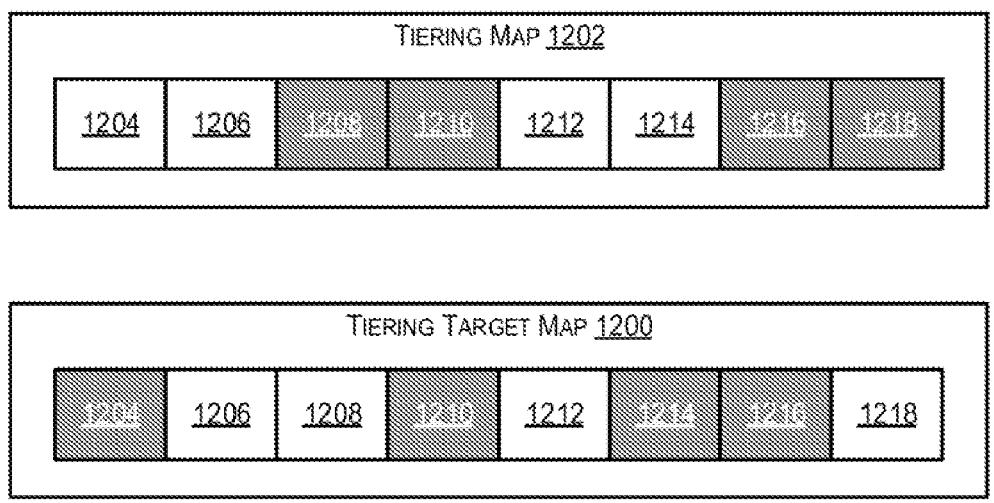
FIG. 12 depicts an exemplary tiering map and tiering target map according to an embodiment.

To provide a concrete example of the processing performed by task generator 914 in FIG. 11, FIG. 12 depicts exemplary tiering target/tiering maps 1200 and 1202 and a set of migration tasks 1-4 that task generator 914 may create in view of these maps.

In tiering target map 1200, the file system blocks at offsets 1204, 1210, 1214, 1216 are designated for placement on flash storage tier 108 (indicated by shading), while the file system blocks at offsets 1206, 1208, 1212, and 1218 are designated for placement on HDD storage tier 110. On the other hand, in tiering map 1202, the file system blocks at offsets 1208, 1210, 1216, and 1218 are currently placed on flash storage tier 108 (indicated by shading), while the file system blocks at offsets 1204, 1206, 1212, and 1214 are currently placed on HDD storage tier 110. This means that the blocks at offsets 1204 and 1214 should be migrated into flash storage tier 108, and the blocks at offsets 1208 and 1218 should be migrated out of flash storage tier 108.

Accordingly, as shown, task generator 914 can generate four migration tasks based on maps 1200 and 1202: tasks 1 and 2 for migrating blocks 1204 and 1214 into flash storage tier 108 via "tier-up" operation invocations, and tasks 3 and 4 for migrating blocks 1208 and 1218 out of flash storage tier 108 via "tier-down" operation invocations.

In some embodiments, task generator 914 can combine certain migration tasks that result in a migration in the same direction (e.g., into or out of flash storage tier 108). In these embodiments, task generator 914 may combine tasks 1 and 2 shown in FIG. 12 into a single tier-up invocation that simultaneously migrates blocks 1204 and 214, and combine tasks 3 and 4 shown in FIG. 12 into a single tier-down operation that simultaneously migrates blocks 1208 and 1218.

The embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory (e.g., a flash memory device), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for optimizing locations for storing and servicing an access request for one or more blocks of a logical file, the method comprising:
   classifying, by a computer system, a plurality of blocks into a firsts subset consisting of hot blocks and a second subset consisting of cold blocks, the classifying comprising classifying frequently accessed one or more blocks of the plurality of blocks into the first subset, and remaining blocks of the plurality of blocks into the second subset;
   storing by the computer system, the firsst subset of blocks in a first physical file residing on a flash storage tier, and storing the second subset of blocks in a second physical file residing on a hard disk (HDD) storge tier;
   receiving, by the computer system, an input/output (I/O) request to access one or more blocks of the plurality of blocks;
   accessing a pointer block cache residing on the flash storage tier, the pointer block cache indicating placement of the requested one or more blocks on the flash storage tier or the HDD storage tier;
   determining, by the computer system, whether the requested one or more blocks are stored on the first physical file or the second physical file based on resolving an offset of the requested one or more blocks to a valid logical block address in the pointer block cache;
   upon determining that the requested one or more blocks are stored on the first physical file, directing the I/O request to the first physical file; and
   otherwise, directing the I/O request to the second physical file.

2. The method of claim 1, wherein directing the I/O request further comprises, on condition that the I/O request is a write request:
   determining the write mode;
   upon the write mode being set to a first value, directing the write request to both the first physical file and the second physical file;
   upon the write mode being set to a second valuel directing the write request to solely the first physical file; and
   upon the write mode being set to a third value, directing the write request to the first physical file and a third physical file distinct from the first and the second physical file.

3. The method of claim 1, further comprising:
   determining whether the I/O request is directed to a hybrid file or a non-hybrid file; and
   upon determining that the I/O request is directed to a hybrid file, proceeding with a determiniation of a location of the requested one or more blocks of the first physical file or the second physical file.

4. The method of claim 1, further comprising:
   detecting an invocation of a tier-up operation or a tier-down operation with respect to one or more of the logical file;
   moving data associated with the one or more blocks of the logical file from the second physical file to the first physical file in response to the tier-up operation; or
   moving data associated with the one or more blocks of the logical file from the first physical file to the second physical file in response to the tier-down operation.

5. The method of claim 4, wherein upon performing the tier-up opertion, updating a tiering map to reflect a current location in the first physical file of the one or more blocks of the logical file.

6. The method of claim 4, wherein upon performing the tier-down operation, updating a tiering map to reflect a current location in the second physical file of the one or more blocks of the logical file.

7. The method of claim 1, further comprising:
   detecting an invocation of a collapse-tier operation with respect to one or more blocks of the logical file:
   moving data associated with the one or more blocks of the logical file from the first physical file to the second physical file; and
   deleting the first physical file from the flash storage tier.

8. A non-transitory computer readable storge medium having stored thereon computer software executable by a processor, the computer software embodying a method for optimizing locations for storing and servicing an access reqeust for one or more blocks of a logical file, the method comprising:
   classifying, by a computer system, a plurality of blocks into a first subset consisting of hot blocks and a second subset consisting of cold blocks, the classifying comprising classifying frequently accessed one or more blocks of the plurality of blocks into the first subset, and remaining blocks of the plurality of blocks into the second subset;
   storing, by the computer system, the first subset of blocks in a first physical file residing on a flash storage tier, and storing the second subset of blocks in a second physical file residing on a hard disk (HDD) storage tier;
   receiving, by the computer system, an input/output (I/O) request to access one or more blocks of the plurality of blocks;
   accessing a pointer block cache residing on the flash storage tier, the pointer block cache indicating placement of the requested one or more blocks on the flash storage tier on the HDD storage tier;
   determining, by the computer system, whether the requested one or more blocsk are stored on the first physical file or the second physical file based on resolving an offset of the requested one or more blocks to a valid logical block address in the pointer block cache;

upon determining that the requested one or more blocks are stored on the first physical file, directing the I/O request to the first physical file, and otherwise, directing the I/O request to the second physical file.

9. The non-transitory computer readable storage medium of claim 8, wherein directing the I/O request further comprises, on condition that the I/O request is a write request:

determining the write mode;

upon the write mode being set to a first value, directing the write request to both the first physical file and the second physical file;

upon the write mode being set to a second value, directing the write request to solely the first physical file; and upon the write mode being set to a third value, directing the write request to the first physical file and a third physical file distinct from the first and the second physical file.

10. The non-transitory coputer readable storage medium of claim 8, wherein the first physical file and the second physical file sahre a common logical address space tht includes the same file system block offsets for the first physical file and the second physical file.

11. The non-transitory computer readable storage medium of claim 8, wherein the method further comprises:

detecting an invocation of a tier-up operation or a tier-down operation with respect to one or more blocks of the logical file;

moving data associated with the one or more blocks of the logical file from the second physical file to the first physical file in respoinse to the tier-up operation; or moving data associated with the one or more blocsk of the logical file from the first physical file to the second physical file in response to the tier-down operation.

12. The non-transitory computer readable storage medium of claim 11, wherein upon performing the tier-up operation, updating a tiering map to reflect a current location in the first physical file of the one or more blocks of the logical file.

13. The non-transitory computer reaadable storage medium of claim 11, wherein upon performing the tier-down operation, upating a tiering map to reflect a current location in the second physical file of the one or more blocks of the logical file.

14. The non-transitory computer readable storage medium of claim 8, wherein, the method further comprises:

detecting an invocation of a collapse-tier operation with respect to one or more blocks of the logical file;

moving data associated with the one or more blocks of the logical file from the first physical file to the second physical file; and deleting the first physical file from the flash storage tier.

15. A system for storing and servicing an access request for one or more blocks of a logical file, the system comprising:

a processor; and a non-transitory computer readable medium having stored thereon program code that, when executed by the processor, causes the processor to:

classify the plurality of blocks into first subset consisting of hot blocks and a second subset consisting of cold blocks, the classifying comprising classifyiung frequently accessed one or more blocks of the plurality of blocks into the first subset, and remaining blocks of the plurality of blocks into the second subset;

store the first subset of blocks in a first physical file residing on a flash storage tier, and storing the second subset of blocks in a second physical file residing on a hard disk (HDD) storage tier;

receive an input/output (I/O) request to access one or more blocks of the plurality of blocks;

access a pointer block cache residing on the flash storage tier, the pointer block cache indicating placement of the requested one or more blocks on the flash storage tier on the HDD storage tier;

determine whether the requested one or more blocks are stored on the first physical file or the second physical file based on resolving an offset of the requsted one or more blocks to a valid logical block address in the pointer block cache;

upon determining that the requested one or more blocks are stored on the first physical file, direct the I/O request to the first physical file; and otherwise, direct the I/O request to the second physical file.

16. The system of claim 15, wherein directing the I/O request further comprises, on condition that the I/O request is a write request:

determining the write mode;

upon the write mode being sent to a first value, directing the write request to both the first physical file and the second physical file;

upon the write mode being set to a second value, directing the write request to solely the first physical file; and upon the write mode being set to a third value, directing the write request to the first physical file and a third physical file distinct from the first and the second physical file.

17. The system of calim 15, wherein the program code when executed by the processor, further causes the processor to:

detect an invocation of a tier-up operation or a tier-down operationn with respect to one or more blocks of the logical file;

move data associated with the one or more blocks of the logical file from the second physical file to the first physical file in response to the tier-up operation; or move data associated with the one or more blocks of the logical file from the first physical file to the second physical file in response to the tier-down operation.

18. The system of claim 17, wherein upon performing the tier-up operation, updating a tiering map to reflect a current location in the first physical file of the one or more blocks of the logical file.

19. The system of claim 17, wherein upon performing the tier-down operation, updating a tiering map to reflect a current location in the second physical file of the one or more blocks of the logical file.

20. The system of claim 15, wherein the program code when executed by the processor, further causes the processor to:

detect an invocation of a collapse-tier operation with respect to one or more blocks of the logical file;

move data associated with the one or more blocks of the logical file from the first physical file to the second physical file; and delete the first physical file from the flash storage tier.

* * * * *